United States Patent [19]

Graveland et al.

[11] Patent Number: 5,336,517
[45] Date of Patent: Aug. 9, 1994

[54] AIR CLASSIFICATION OF FLOUR

[75] Inventors: Aris Graveland, Vlaardingen; Matthijs H. Henderson, Rotterdam; Leonie J. M. Linders, Bakel, all of Netherlands

[73] Assignee: Unilever Patent Holdings B.V., Vlaardingen, Netherlands

[21] Appl. No.: 15,196

[22] Filed: Feb. 11, 1993

[30] Foreign Application Priority Data

Feb. 12, 1992 [EP] European Pat. Off. ....... 92200386/8

[51] Int. Cl.$^5$ ............................................. A23J 3/18
[52] U.S. Cl. ................... 426/622; 426/478; 426/479; 426/481; 426/549
[58] Field of Search ............... 426/622, 549, 478, 479, 426/481

[56] References Cited

U.S. PATENT DOCUMENTS

| | | |
|---|---|---|
| 4,688,727 | 8/1987 | Sijsling ................... 241/56 |
| 5,033,371 | 7/1991 | Satake et al. ............. 99/519 |
| 5,063,078 | 11/1991 | Foehse ................... 426/618 |
| 5,130,158 | 7/1992 | Otsubo et al. ............ 426/622 |

FOREIGN PATENT DOCUMENTS

| | | |
|---|---|---|
| 0459551 | 12/1991 | European Pat. Off. ...... A21D 6/00 |
| 1270380 | 6/1968 | Fed. Rep. of Germany . |
| 2242666 | 9/1990 | Japan . |

OTHER PUBLICATIONS

Jones et al., J. of Biochemical and Microbiological Technology and Engineering, 1(1):77-98 (1959).
Stringfellow et al., The Northwestern Miller, pp. 19-22 (Mar. 16, 1964).

Primary Examiner—Jeanette Hunter
Assistant Examiner—Mary S. Mims
Attorney, Agent, or Firm—Cushman, Darby & Cushman

[57] ABSTRACT

Air-classification of flours with a particle size of 5-160 μm is best performed on flours that are remilled at least once to give a remilled flour with an x-50 of less than 40 μm.

The remilling, preferably being carried out by using a jet air mill, a Retsch mill or an extruder. In this way a higher yield of a fraction, enriched in protein (up to 40% protein) and a higher yield of a starch fraction with a low protein content (even less than 3 wt %) can be obtained. Wetting of the remilled flour, prior to remilling and drying of the remilled flour, prior to air classification lead to improved results.

9 Claims, No Drawings

AIR CLASSIFICATION OF FLOUR

FIELD OF THE INVENTION

The present invention concerns a method for the air classification of flour having a particle size distribution of 5–160 μm.

DESCRIPTION OF PRIOR ART

Although air classification of such flours is known in the prior art (cf. Jones et al, J. Biochem. Microbiol. Techn. Eng. 1 (1959), 77–97; Stringfellow et al, Northwest Miller 270 (1964), 19), there are still a number of problems attached to these prior art methods. Thus, for example, the yields of protein-enriched product fractions were relatively low, whereas the protein contents of the starch-enriched fractions were too high for them to be useful as a starch. This is a.o. due to the fact that Stringfellow et al. first apply air classification and then remilling of the fines obtained. A second air classification can then be applied to the remilled fines. Jones et al. disclose that premilling, prior to air classification can lead to fines with an increased protein content. However, only small amounts of fines with the increased protein content were obtained (cf. table V). Jones further applies a process, wherein the water content of the flour prior to re-milling is decreased (cf. Table V).

The above-mentioned problems are probably related with insufficient disrupture of the endosperm particles. Therefore, we have studied methods by which this disrupture could be improved. As a result of thes studies, we have found that remilling of the flour under specific conditions can improve this disrupture, resulting in high yields of fines having an increased protein content and in starch fractions having a very low protein content.

SUMMARY OF THE INVENTION

Therefore, our invention is concerned with a method for the air classification of flour having a particle size distribution of 5–160 μm, wherein:
- a flour with an enhanced water content is remilled at least once, to give a remilled flour having a specific size diameter X-50 of less than 40 μm, preferably less than 30 μm, in particular 15–25 μm.
- the resulting, remilled flour is air-classified, applying an air flow rate setting and/or a classifier speed with which a predetermined cut point can be achieved.
- collecting a protein-enriched fraction as a fine fraction in a yield of at least 30 wt. %, and a starch-enriched fraction as a coarse fraction in a yield of at most 70 wt. %.

DETAILED DESCRIPTION OF INVENTION

The specific size diameter X-50 is defined as the diameter whereby 50% of the flour particles have a diameter of less than X-50 (on volume/volume base).

The cut point is defined as that particle size at which all particles below the cut point are in the fine fraction and all particles above the cut point are in the coarse fraction.

The air classification can be performed with any type of air classifier, e.g. an Alpine Lab Zig-Zag-100 MZR classifier ®. The cut point can be chosen by selecting a specific air flow rate setting and/or classifier speed.

Particle size measurements were performed, using a Sympatec Helos Particle Sizer ® equipped with a 100 mm lens. All particle size measurements were carried out on water suspensions, which were stirred magnetically and sonificated.

The purpose of the remilling is to disrupt the endosperm of the particle in a more efficient way. We have found that this purpose is achieved when the remilling leads to a specific size diameter X-50 of less than 40 μm, preferably less than 30 μm, in particular 15–25 μm. These values for X-50 are obtained when the remilling is performed at least once, but preferably twice, using a jet air mill, a Retsch mill ® or an extruder. Although the best results are obtained with a jet air mill, we prefer to use the Retsch mill since the energy input is very high for a jet air mill. The amount of damaged starch in the remilled flour is in general less than 8 wt %. However, this is dependent on the hardness of the flour and the mill applied for the remilling.

The air classification is carried out with standard equipment. The efficiency of the air classification is determined mainly by the cut point selected. In general, a cut point of 20 or less is applied.

The two fractions which are separated by air classification are:

1) a fine fraction having a particle size below the cut point, containing 18–40 wt. % of protein, in particular 20–30 wt. % of protein, most preferably 25–30 wt % of protein.

2) a coarse fraction having a particle size above the cut point, containing at most 7 wt. %, preferably less than 5 wt. % and in particular less than 3 wt. % of protein.

This latter fraction therefore consists mainly of starch. Starch fractions having very low protein contents are very useful for several applications, whereby the presence of protein should be avoided as much as possible.

The exact protein content of the two fractions will greatly depend on many factors, such as protein content of the starting flour, efficiency of the starch/protein disruptures in the endosperm, type of remiller, cut point etc.

It is, however, preferred to use flours having a protein content of 10–15 wt. % as starting material. In particular, soft flours having a relatively high protein content are preferred. Examples of flours that can be used include Zeeuws ®, Camp Remy ® (both low in protein: 8–9 wt. %), Monopol ®, CWRS ® and DNS ® (11–13 wt. % of protein). However, many other types of flours exist that can be used.

We have found, unexpectedly, that the efficiency of the remilling of the flour is influenced by the moisture content of the flour subjected to remilling. In fact, we have found that flour having a relatively high moisture content gave the best results when subjected to air classification after remilling.

Therefore, we apply a flour with an enhanced water content. We prefer to increase the moisture content of the flour subjected to remilling, prior to remilling, by 10–30% of the original moisture content of the flour.

However, the best results with air classification are obtained when the remilled flour is dried prior to air classification. Therefore, we prefer to decrease the water content of the remilled flour, prior to air classification, by 10–50% of the original moisture content of the remilled flour.

Accordingly, the best sequence of process steps is:

selecting a flour having a particle size of 5–160 μm and a moisture content of 10–15 wt. %;
increasing the moisture content by 10–30 wt. %;
remilling the moistened flour to specific size diameter X-50<40 μm;
drying the remilled flour, reducing the moisture content by 10–50 wt. %;
air-classifying the dried, remilled flour, using a cut point of at most 20 μm;
collecting a fraction of fine particles (≧30%) and a fraction of coarse particles (≦70%).

Parts of the invention are also (1) flour fractions having a specific size diameter of less than 20 μm and a protein content of 18–40 wt. %, preferably 20–30 wt % and (2) starch fractions having a specific size diameter of more than 20 μm and a protein content of less than 3 wt. %.

Doughs prepared from flour consisting at least in part of the above-mentioned protein-enriched flour fractions are also part of the invention. Further, the use of the starch fraction according to the invention in sponge-doughs or in batters is part of the invention.

Experimental Part

In this experimental part, the flours having the composition mentioned in Table I were used.

The protein content was determined by ICC Standard 136 (=Kjeldahl).

The SDS sediment was determined by suspending a sample in a 1.4% solution of SDS protein (ICC Standard 116).

The moisture content was determined by drying at 130° C. for 1.5 hours (ICC Standard 110/1).

TABLE I

COMPOSITION OF WHEAT FLOURS

| Sample | Protein content (%) | Ash content (%) | Moisture content (%) | SDS sediment (mm) |
|---|---|---|---|---|
| Zeeuws | 8.8 | 0.51 | 14.5 | 40 |
| Camp Remy | 8.7 | 0.47 | 14.0 | 92 |
| Monopol | 11.2 | 0.43 | 14.2 | 95 |
| CWRS | 13.3 | 0.45 | 14.0 | 92 |
| DNS | 13.3 | 0.45 | 15.8 | 95 |

Air Classification

In order to establish the cut point or vane setting for optimal separation of wheat flours into separate fractions, i.e. small starch kernels plus protein bodies and intact flour particles plus large starch kernels, we have investigated, with the aid of air classification, an untreated commercial soft wheat flour (Zeeuws) and a hard wheat flour (Monopol) at different cut points. The yield, protein content and protein shift of the fine and coarse fractions were determined. The results are summarised in Tables II and III. These results show that in both cases the highest protein content was obtained with a cut point of 10 μm. The fine fraction of Zeeuws flour had a protein content of 19.8% and accounted for 6.2% of the flour weight and 14% of the total protein content.

The fine fraction of Monopol, on the contrary, had a protein content of 18.8% and accounted for 4.2% of the flour weight and 6% of the total protein content.

The bigger the cut points, the higher the yield of the fine fraction; however, the lower the protein content, the lower the effect of separation. This means: the bigger the cut points, the slighter the separation between protein bodies and intact flour particles, thus hardly any protein shift.

The results also show that a soft flour had a higher yield of the protein bodies containing the fine fraction than a hard flour.

A soft flour contains more disaggregated flour particles. Therefore, a soft flour will respond better to air classification than a hard wheat flour.

After a second classification of the fine fraction obtained at a cut point of 20 μm, a cut point of 10 μm gave a fine fraction having a protein content of 23% and 26.7% of protein, respectively, for Zeeuws and Monopol. In this case, more protein shifted into the high protein fraction but nevertheless it was 13 and 6%, respectively, of the total protein. This means therefore the same as that obtained at a cut point of 20 μm.

TABLE II

AIR CLASSIFICATION OF FLOUR (Zeeuws)

| Cut point | Fractions | Yield (%) | Protein content (%) | Percentage of total protein |
|---|---|---|---|---|
| Flour: 14.5% moisture and 8.8% protein | | | | |
| 10 μm | fines | 6.2 | 19.8 | 14 |
|  | coarses | 91.7 | 8.2 | 86 |
| 20 μm | fines | 13.4 | 13.8 | 20 |
|  | coarses | 83.7 | 8.3 | 78 |
| 30 μm | fines | 26.9 | 9.6 | 30 |
|  | coarses | 71.5 | 8.6 | 70 |
| 40 μm | fines | 43.5 | 9.3 | 46 |
|  | coarses | 55.3 | 8.7 | 54 |
| Fraction: fines of 20 μm | | | | |
| 10 μm | fines | 38.5 | 23.0 | 13 |
|  | coarses | 60.0 | 7.6 | 7 |

TABLE III

AIR CLASSIFICATION OF FLOUR (Monopol)

| Cut point | Fractions | Yield (%) | Protein content (%) | Percentage of total protein |
|---|---|---|---|---|
| Flour: 14.2% moisture and 11.2% protein | | | | |
| 10 μm | fines | 4.2 | 18.8 | 6 |
|  | coarses | 94.7 | 12.3 | 94 |
| 20 μm | fines | 8.5 | 18.1 | 12 |
|  | coarses | 92.7 | 12.0 | 88 |
| 30 μm | fines | 14.5 | 14.2 | 17 |
|  | coarses | 84.2 | 12.2 | 83 |
| 40 μm | fines | 22.4 | 12.8 | 24 |
|  | coarses | 76.4 | 12.2 | 76 |
| Fraction: fines of 20 μm | | | | |
| 10 μm | fines | 34.5 | 26.7 | 6 |
|  | coarses | 61.0 | 13.9 | 6 |

Effect if Remilling

The above-mentioned results have shown that only a small part of a commercial flour consists of disaggregated flour particles. In order to obtain higher yields of fine, protein-enriched fractions, remilling of the flour is necessary.

Different mills were tested, viz. Jet air mill, Roller mill, Alpine pinn mill and a Retsch mill equipped with a 0.8 mm screen.

The remilled flours obtained with different mills were air-classified at a cut point of 20 μm. The results are summarised in Table IV.

The highest yield of the fine fraction was obtained with the flour remilled with a Jet air mill.

The lowest yield was obtained with the flour remilled with a Roller mill.

The Retsch mill also gave acceptable results.

Table V shows the results obtained with Zeeuws flour that had been remilled once. From the results it can be concluded that air classification at a cut point of 20 μm gave the highest yield of protein-enriched fraction. The fraction has a protein content of 15% and accounted for 37% of the flour weight and 66% of the total protein content.

Tables VI and VII show the results obtained by air classification of four flours which were remilled once or twice. Zeeuws flour gave the highest yield of the fine fraction, viz. 41.1%. In all cases there is clearly an additional protein shift to the fine fraction after a second remilling action.

The lowest protein content of the coase fraction was obtained with Zeeuws flour.

TABLE IV

AIR CLASSIFICATION OF REMILLED FLOURS
OBTAINED WITH DIFFERENT MILLS

Flour: DNS, 15.8% moisture and 13.3% protein
Air classification: cut point 20 μm

| Type of mill | Fractions | Yield (%) | Protein content (%) | Percentage of total protein |
|---|---|---|---|---|
| Jet air mill | fines | 36.1 | 25.2 | 70 |
|  | coarses | 63.2 | 6.1 | 30 |
| Roller mill | fines | 22.4 | 19.0 | 32 |
|  | coarses | 76.1 | 12.0 | 68 |
| Alpine mill | fines | 25.5 | 21.2 | 40 |
|  | coarses | 74.1 | 11.2 | 60 |
| Retsch mill | fines | 32.2 | 20.4 | 49 |
|  | coarses | 68.1 | 10.2 | 51 |

TABLE V

AIR CLASSIFICATION OF FLOUR (Zeeuws)
Effect of remilling with a Retsch mill
Flour: Zeeuws, remilled 1x

| Cut point | Fractions | Yield (%) | Protein content (%) | Percentage of total protein |
|---|---|---|---|---|
| 10 μm | fines | 30.2 | 17.2 | 60 |
|  | coarses | 68.4 | 5.0 | 40 |
| 20 μm | fines | 37.1 | 15.0 | 66 |
|  | coarses | 60.4 | 5.1 | 34 |
| 25 μm | fines | 49.3 | 10.1 | 56 |
|  | coarses | 50.3 | 7.5 | 43 |
| 30 μm | fines | 52.6 | 9.2 | 54 |
|  | coarses | 47.2 | 8.4 | 46 |

TABLE VI

AIR CLASSIFICATION OF FLOURS
Effect of remilling once and twice
Air classification: cut point 20 μm

| Sample | Yield (%) | Protein content (%) | Percentage of total protein |
|---|---|---|---|
| DNS (original) |  | 13.3 |  |
| *fines | 5.1 | 19.2 | 7 |
| *coarses | 94.2 | 13.1 | 93 |
| remilled 1x |  |  |  |
| *fines | 32.2 | 20.4 | 49 |
| *coarses | 68.1 | 10.2 | 51 |
| remilled 2x |  |  |  |
| *fines | 36.6 | 27.1 | 74 |
| *coarses | 62.5 | 5.5 | 26 |
| CWRS (original) |  | 13.3 |  |
| *fines | 3.2 | 20.2 | 5 |
| *coarses | 96.2 | 13.2 | 95 |
| remilled 1x |  |  |  |
| *fines | 26.1 | 18.0 | 35 |
| *coarses | 73.1 | 12.5 | 65 |
| remilled 2x |  |  |  |
| *fines | 31.2 | 25.1 | 57 |
| *coarses | 68.1 | 8.3 | 43 |

TABLE VII

AIR CLASSIFICATION OF FLOURS
Effect of remilling once and twice
Air classification: cut point 20 μm

| Sample | Yield (%) | Protein content (%) | Percentage of total protein |
|---|---|---|---|
| Camp Remy |  | 8.7 |  |
| *fines | 7.1 | 12.0 | 9 |
| *coarses | 92.5 | 8.4 | 91 |
| remilled 1x |  |  |  |
| *fines | 23.9 | 17.2 | 48 |
| *coarses | 75.3 | 6.0 | 52 |
| remilled 2x |  |  |  |
| *fines | 30.2 | 18.2 | 63 |
| *coarses | 70.1 | 4.5 | 37 |
| Zeeuws (original) |  | 8.8 |  |
| *fines | 13.2 | 13.8 | 22 |
| *coarses | 83.7 | 8.3 | 78 |
| remilled 1x |  |  |  |
| *fines | 37.1 | 15.0 | 66 |
| *coarses | 60.4 | 5.1 | 34 |
| remilled 2x |  |  |  |
| *fines | 41.1 | 17.1 | 80 |
| *coarses | 57.2 | 3.2 | 20 |

Effect of moisture content on flour

Zeeuws flour having a moisture content of 15% was moistened to 17% and two other batches were dried to 12 to 10% moisture, respectively. These flours were remilled with the aid of a Retsch mill. First of all, the particle size distribution of these flours was determined.

Table VIII shows the X-50 values of the remilled flours. After remilling, the flour having a moisture content of 17% had an X-50 of 20 μm. The lower the moisture content, the higher the X-50 value, which means the lower the disaggregation of the flour particles. These flours were also air-classified at a cut point of 20 μm. The results are shown in Table IX. The higher degree of disaggregation of flour particles in the flour sample having 17% moisture content finds also expression in the air classification.

We have also investigated the effect of moisture content on the efficiency of air classification.

Remilled Zeeuws flour having a moisture content of 14% was dried to a moisture content of 8%. Both flours were air-classified. The results shown in Table X illustrate that drying of the flour has a positive effect on the separation into fines and coarses by air classification.

TABLE VIII

PARTICLE SIZE DISTRIBUTION OF REMILLED FLOURS EFFECT OF MOISTURE

| Sample | Specific particle size diameter: X-50 |
|---|---|
| Zeeuws, 17.0% moisture | 20 μm |
| Zeeuws, 14.8% moisture | 23 μm |
| Zeeuws, 12.0% moisture | 26 μm |
| Zeeuws, 10.0% moisture | 30 μm |

TABLE IX

AIR CLASSIFICATION OF FLOURS MENTIONED IN TABLE VII

Flour: Zeeuws
Air classification: cut point 20 μm

| Sample | Yield (%) | Protein content (%) | Percentage of total protein |
|---|---|---|---|
| Flour, 17.0% moisture | | | |
| *fines | 36.1 | 18.1 | 73 |
| *coarses | 62.4 | 3.8 | 27 |
| Flour, 14.8% moisture | | | |
| *fines | 37.1 | 15.0 | 64 |
| *coarses | 60.2 | 5.4 | 36 |
| Flour, 12.0% moisture | | | |
| *fines | 30.1 | 14.2 | 49 |
| *coarses | 68.2 | 6.5 | 51 |
| Flour, 10.0% moisture | | | |
| *fines | 26.1 | 13.1 | 37 |
| *coarses | 73.1 | 8.0 | 63 |

TABLE X

AIR CLASSIFICATION OF FLOURS HAVING A DIFFERENT MOISTURE CONTENT

Flour: Zeeuws
Air classification: cut point 20 μm

| Sample | Yield (%) | Protein content (%) | Percentage of total protein |
|---|---|---|---|
| Remilled flour moisture content 14% | | | |
| *fines | 37.1 | 15.0 | 64 |
| *coarses | 60.1 | 5.4 | 36 |
| Remilled flour moisture content 8% | | | |
| *fines | 38.2 | 18.1 | 72 |
| *coarses | 60.1 | 4.5 | 28 |

I claim:

1. A method for the air classification of flour having a particle size distribution of 5–160 μm, comprising
   enhancing the water content by 10–30% of the original moisture content of the flour
   remilling the enhanced water content at least once, to give a remilled flour having a specific size diameter X-50 of less than 40 μm,
   air classifying the resulting remilled flour by applying the air flow rate setting and a classifier speed with which a predetermined cut point can be achieved, to form a protein enriched fraction and a starch-enriched fraction and
   collecting the protein-enriched fraction as a fine fraction in a yield of at least 30 wt %, and the starch-enriched fraction as a coarse fraction in a yield of at most 70 wt. %.

2. A method according to claim 1, wherein the remilling is carried out in a milling system chosen from the group consisting of a jet air mill, a Retsch mill or an extruder.

3. A method according to claim 2, wherein the remilling is carried out to give flour with X-50=15–25 μm.

4. A method according to claim 1, wherein the remilling is carried out twice.

5. A method according to claim 1, wherein flour having a protein content of 10–15 wt. % is used.

6. A method according to claim 1, wherein a cut point of 20 or less is used.

7. A method according to claim 1, wherein the fraction containing the fine particles contains 18–40 wt. % of proteins.

8. A method according to claim 1, wherein the fraction containing the coarse particles contains at most 7 wt. % of proteins.

9. A method according to claim 1, wherein the moisture content of the remilled flour, prior to air classification, is reduced by 10–50% of the original moisture content of the remilled flour.

* * * * *